US010797545B2

(12) United States Patent
Hosoda

(10) Patent No.: US 10,797,545 B2
(45) Date of Patent: Oct. 6, 2020

(54) MAGNET-EMBEDDED TYPE ROTOR AND ELECTRIC ROTATING MACHINE HAVING MAGNET-EMBEDDED TYPE ROTOR

(71) Applicant: FANUC CORPORATION, Yamanashi (JP)

(72) Inventor: Akihiro Hosoda, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 131 days.

(21) Appl. No.: 15/954,790

(22) Filed: Apr. 17, 2018

(65) Prior Publication Data

US 2018/0309335 A1 Oct. 25, 2018

(30) Foreign Application Priority Data

Apr. 19, 2017 (JP) .................................. 2017-082497

(51) Int. Cl.
*H02K 1/27* (2006.01)
*H02K 1/28* (2006.01)
*H02K 21/14* (2006.01)

(52) U.S. Cl.
CPC .............. *H02K 1/2766* (2013.01); *H02K 1/28* (2013.01); *H02K 21/14* (2013.01)

(58) Field of Classification Search
CPC ......... H02K 1/2766; H02K 1/28; H02K 21/14
USPC ........................... 310/156.56, 156.53, 156.57
See application file for complete search history.

(56) References Cited

U.S. PATENT DOCUMENTS

| 4,327,302 A | 4/1982 | Hershberger | |
|---|---|---|---|
| 4,434,546 A * | 3/1984 | Hershberger | ........ H02K 1/2766 29/418 |
| 2012/0126637 A1* | 5/2012 | Ankeney | ................ H02K 15/03 310/43 |
| 2012/0293033 A1* | 11/2012 | Hisada | ................... H02K 1/276 310/156.43 |

(Continued)

FOREIGN PATENT DOCUMENTS

| CN | 102790458 A | 11/2012 |
|---|---|---|
| JP | S56046657 A | 4/1981 |
| JP | 99537 A | 1/1997 |

(Continued)

OTHER PUBLICATIONS

English Abstract and Machine Translation for Japanese Publication No. JPH11-206049 A, published Jul. 30, 1999, 18 pgs.

(Continued)

*Primary Examiner* — Michael Andrews
(74) *Attorney, Agent, or Firm* — Fredrikson & Byron, P.A.

(57) ABSTRACT

A rotor has a first slot and a second slot, each having a substantially rectangular section, the rectangular sections being arranged in a V-shape when viewed from the direction of the rotary axis; and a first permanent magnet and a second permanent magnet, each having a substantially rectangular shape when viewed from the direction of the rotary axis, inserted in the first slot and the second slot, respectively. This rotor further has a communicating portion having a section that is defined by a side connected between the close (Continued)

pair of end points of the rectangular sections of the first and second slots and a side connected between the distant pair of the end points, among the wend points located on the radially inner side when viewed from the direction of the rotational axis.

5 Claims, 3 Drawing Sheets

(56) References Cited

U.S. PATENT DOCUMENTS

2013/0119807 A1* 5/2013 Nakada ................ H02K 1/2706
                                                    310/156.38
2013/0257210 A1* 10/2013 Hattori .................... H02K 1/27
                                                    310/156.08

FOREIGN PATENT DOCUMENTS

| JP | H11146584 | A | | 5/1999 |
| JP | 11206049 | A | | 7/1999 |
| JP | 2001268873 | A | | 9/2001 |
| JP | 200432844 | A | | 1/2004 |
| JP | 2004147487 | A | | 5/2004 |
| JP | 2007336671 | A | | 12/2007 |
| JP | 201045974 | A | | 2/2010 |
| JP | 20114480 | A | | 1/2011 |
| JP | 2011004480 | A | * | 1/2011 |
| JP | 2012227993 | A | | 11/2012 |
| JP | 2014121202 | A | | 6/2014 |
| WO | 2012014834 | A1 | | 2/2012 |

OTHER PUBLICATIONS

English Abstract and Machine Translation for Chinese Publication No. 102790458 A, published Nov. 21, 2012, 11 pgs.
English Abstract and Machine Translation for Japanese Publication No. 09-009537 A, published Jan. 10, 1997, 10 pgs.
English Abstract and Machine Translation for Japanese Publication No. 2001-268873 A, published Sep. 28, 2001, 6 pgs.
English Abstract and Machine Translation for Japanese Publication No. 2011-004480 A, published Jan. 6, 2011, 10 pgs.
English Abstract for Japanese Publication No. 2012-227993 A, published Nov. 15, 2012, 1 pg.
English Abstract and Machine Translation for Japanese Publication No. 2010-045974 A, published Feb. 25, 2010, 12 pgs.
English Abstract and Machine Translation for Japanese Publication No. 2004-032844 A, published Jan. 29, 2004, 7 pgs.
English Abstract and Machine Translation for Japanese Publication No. 2014-121202 A, published Jun. 30, 2014, 10 pgs.
English Abstract and Machine Translation for Japanese Publication No. JPH11-146584A, published May 28, 1999, 16 pgs.
English Abstract and Machine Translation for Japanese Publication No. JP2004-147487A published May 20, 2004, 10 pgs.
English Abstract and Machine Translation for Japanese Publication No. JP2007-336671A, published Dec. 27, 2007, 9 pgs.
English Abstract for Japanese Publication No. JPS56-046657A, published Apr. 27, 1981, 2 pgs.

* cited by examiner

MAGNET-EMBEDDED TYPE ROTOR AND ELECTRIC ROTATING MACHINE HAVING MAGNET-EMBEDDED TYPE ROTOR

CROSS-REFERENCE TO RELATED APPLICATION

This application is based upon and claims the benefit of priority from Japanese Patent Application No. 2017-082497 filed on Apr. 19, 2017, the contents of which are incorporated herein by reference.

BACKGROUND OF THE INVENTION

Field of the Invention

The present invention relates to a magnet-embedded type rotor and an electric rotating machine having a magnet-embedded type rotor.

Description of the Related Art

International Publication No. WO 2012/014834 discloses a rotor in which multiple permanent magnets are inserted in multiple hollows in the rotor core. In the rotor, the hollows are arranged in pairs, and each pair of hollows are arranged in a symmetrical fashion with respect to a symmetrical line so that their proximal ends on the rotor shaft side reach the symmetrical line and their distal ends are arranged away from each other. Around the proximal ends of the hollows, an abutment surface is formed for each hollow so as to keep the side surface of the inserted permanent magnet away from the symmetrical line.

SUMMARY OF THE INVENTION

Since, in the configuration of International Publication No. WO 2012/014834, each of the permanent magnets are put in contact with the abutment surface in the proximal portion of the hollow, there was a problem that magnetic flux leaks through the abutment surface to the rotor shaft side.

The present invention has been devised to solve the above problem, it is therefore an object of the present invention to provide a rotor and an electric rotating machine that can suppress magnetic flux leakage of permanent magnets provided in a rotor core.

The aspect of the present invention resides in a rotor comprising: a rotor core configured to rotate integrally with a rotor shaft; a first slot and a second slot, each penetrating through the rotor core in a direction of a rotary axis and when viewed from the direction of the rotary axis of the rotor core, having a substantially rectangular shape, the first slot and the second slot being arranged in a V-shape in which radially outer ends of the first slot and the second slot are apart from each other and radially inner ends of the first slot and the second slot are close to each other; a first permanent magnet and a second permanent magnet, each having a substantially rectangular shape when viewed from the direction of the rotary axis of the rotor core, and being inserted in the first slot and the second slot, respectively; and a communicating portion that penetrates through the rotor core in the direction of the rotary axis and when viewed from the direction of the rotary axis of the rotor core, has an edge connecting a pair of closer end points and an edge connecting a pair of farther end points of short edges on a radially inner side of the first and second slots.

According to the present invention, it is possible to suppress magnetic flux leakage from the permanent magnets.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Now, the present invention will be described with reference to embodiments of the invention. The following embodiments will not limit the invention according to the claims. Not all combinations of features described in the embodiments are necessarily essential to the solution means of the invention.

[First Embodiment]

[Configuration of Electric Rotating Machine]

Figure 1:
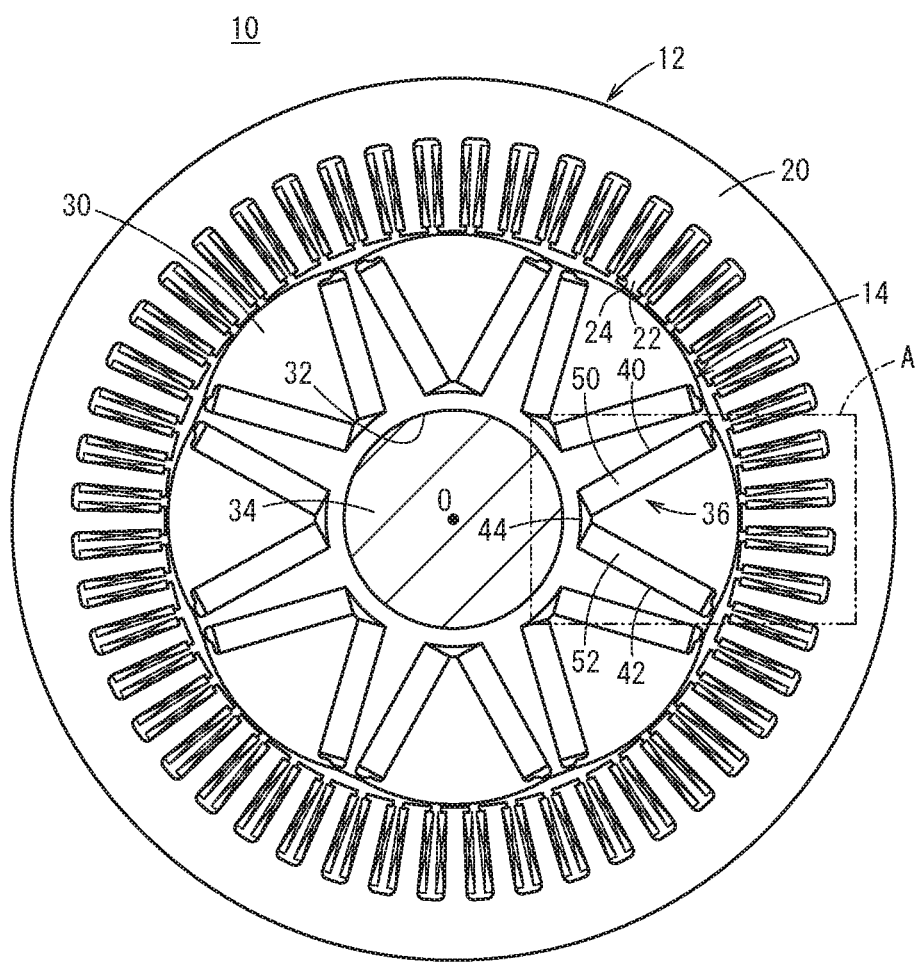
FIG. 1 is a schematic diagram showing a configuration of an electric rotating machine.
Figure 2:
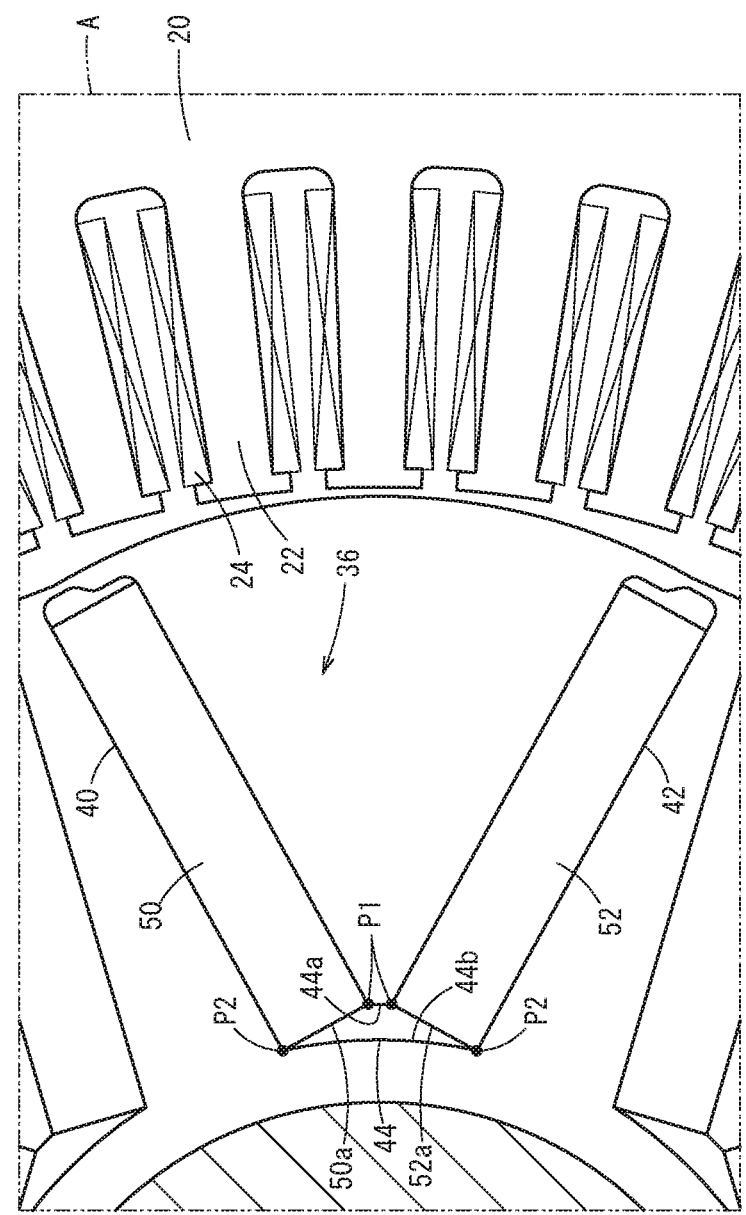
FIG. 2 is an enlarged view of a rectangular portion A in FIG. 1.

FIG. 1 is a schematic diagram showing a configuration of an electric rotating machine 10. FIG. 2 is an enlarged view of a rectangular portion A in FIG. 1. The electric rotating machine 10 has a stator 12 and a rotor 14. The stator 12 has a substantially cylindrical stator core 20 formed of an iron-based metal. The stator core 20 has a plurality of teeth 22 protruding radially inward, formed in the circumferential direction, and each of the teeth 22 has a coil 24 wound thereon.

The rotor 14 has a substantially cylindrical rotor core 30 formed of layered steel plates in which thin steel plates are laminated in the direction of a rotary axis O. The rotor core 30 is formed with a shaft insertion hole 32 penetrating through the central portion thereof along the rotary axis O. A rotor shaft 34 is inserted through the shaft insertion hole 32 by shrink-fitting. Thereby, the rotor core 30 rotates integrally with the rotor shaft 34. The rotor core 30 has a plurality of slots 36 that are arranged in the circumferential direction and penetrate therethrough in the direction of the rotary axis O.

Each slot 36 has a first slot 40, a second slot 42, and a communicating portion 44. The first slot 40 and the second slot 42 are formed in a substantially rectangular shape when the rotor core 30 is viewed from the rotary axis O direction. The first slot 40 and the second slot 42 are laid out in a V-shape in which their radially outer ends are apart from each other and their radially inner ends are close to each other when the rotor core 30 is viewed from the direction of the rotary axis O.

The communicating portion 44 is formed on the radially inner side of the first slot 40 and the second slot 42. Specifically, when the rotor core 30 is viewed from the direction of the rotary axis O, the communicating portion 44 is formed in an approximately isosceles trapezoidal shape having a side connecting a pair of end points P1 and P1, which is closer to each other, and a side connecting a pair of the corner end points P2 and P2, which is farther to each other, where P1 and P2 are end points of sides of the first slot 40 and the second slot 42 on the radially inner side.

A first permanent magnet 50 is inserted in the first slot 40 and a second permanent magnet 52 is inserted in the second slot 42. Thus, the first permanent magnet 50 and the second permanent magnet 52 are arranged in a V-shape. At this time, the inner side pole of the first permanent magnet 50 and the inner side pole of the second permanent magnet 52 are arranged so as to have the same polarity.

The first permanent magnet 50 and the second permanent magnet 52 are substantially rectangular-shaped when the rotor core 30 is viewed from the direction of the rotary axis O, and are formed slightly smaller than the first slot 40 and the second slot 42 so as to be inserted into the first slot 40 and the second slot 42. The first permanent magnet 50 and the second permanent magnet 52 abut against respective end points P2 of the communicating portion 44 so as to be positioned relative to the first slot 40 and the second slot 42. In this state, the short sides 50a, 52a on the radially inner side of the first permanent magnet 50 and the second permanent magnet 52 coincide with the short sides on the radially inner side of the first slot 40 and the second slot 42. The first slot 40, the second slot 42, and the communicating portion 44 are filled with a resin so that the first permanent magnet 50 and the second permanent magnet 52 are fixed in the first slot 40 and the second slot 42.

When the rotor core 30 is viewed from the direction of the rotary axis O, the side surface 44a between the end points P1, P1 of the communicating portion 44, the side surface 44b between the end points P2, P2, and the short sides 50a and 52a of the first permanent magnet 50 and the second permanent magnet 52 on the radially inner side form a space having a substantially isosceles trapezoidal cross-section. When the rotor core 30 is viewed from the direction of the rotary axis O, the cross-sections of side surface 44a and the side surface 44b may be in a linear shape or in an arc shape with the rotary axis O being the arc's center.

[Operation and Effect]

In order to secure the necessary torque of the electric rotating machine 10, it is necessary to enlarge as much as possible an area of a surface of the first permanent magnet 50 and the second permanent magnet 52 in the circumferential direction of the rotor core 30. On the other hand, it is necessary to secure a shrink-fitting margin for shrink-fitting the rotor shaft 34 to the rotor core 30 while making the diameter of the rotor core 30 as small as possible. Accordingly, in the electric rotating machine 10 of the present embodiment, the first permanent magnet 50 and the second permanent magnet 52 are arranged in a V-shape.

At this time, as the contact area between the rotor core 30 and the short sides 50a, 52a on the radially inner side of the first and second permanent magnets 50 and 52 increases, the magnetic flux flows out from the first permanent magnet 50 and the second permanent magnet 52 so that magnetic flux leakage increases and the torque of the electric rotating machine 10 decreases.

To deal with this, in the present embodiment, the communicating portion 44 is provided that, when viewed from the direction of the rotary axis O of the rotor core 30, has a side connecting the pair of the end points P1 and P1, which is closer to each other, and a side connecting the pair of the end points P2 and P2, which is more distanced to each other, where P1 and P2 are end points of short edges on the radially inner side of the first slot 40 into which the first permanent magnet 50 is inserted and of the second slot 42 into which the second permanent magnet 52 is inserted. Thus, this arrangement makes it possible to create such a structure as to separate the entire side faces of the first and second permanent magnets 50 and 52 on the radially inner side from the rotor core 30, whereby it is possible to reduce magnetic flux leakage.

Further, in the present embodiment, the communicating portion 44 is formed in a substantially isosceles trapezoidal shape when viewed from the direction of the rotary axis O of the rotor core 30. When viewed from the direction of the rotary axis O of the rotor core 30, the side surface 44a of the communicating portion 44 is formed in a linear shape or in an arc shape having the rotary axis O as its center so that the side surface 4a is substantially parallel to the inner peripheral surface of the shaft insertion hole 32. Thus, this arrangement makes it possible to have a shrink-fitting margin of the rotor shaft 34 in the rotor core 30.

In the present embodiment, the short sides 50a, 52a on the radially inner side of the first and second permanent magnets 50 and 52 coincide with the short sides on the radially inner side of the first and second slots 40 and 42. As a result, the first permanent magnet 50 and the second permanent magnet 52 abut the end points P1 of the first and second slots 40 and 42 and thus can be positioned relative to the first and second slots 40 and 42, respectively. Further, the dimension of the slot 36 along the radial direction of the rotor core 30 can be shortened, so that the diameter of the rotor core 30 can be reduced.

Further, in this embodiment, the first slot 40, the second slot 42, and the communicating portion 44 are filled with a resin. Thereby, the first permanent magnet 50 and the second permanent magnet 52 can be fixed with respect to the first slot 40 and the second slot 42.

[Other Embodiments]

Although the present invention has been described with reference to the embodiments, the technical scope of the present invention should not be limited to the scope described in the above embodiment. It goes without saying that various modifications and/or improvements can be added to the above embodiment. It is obvious from the description of the scope of the claims that modes with such modifications and/or improvements can be included in the technical scope of the present invention.

Figure 3:
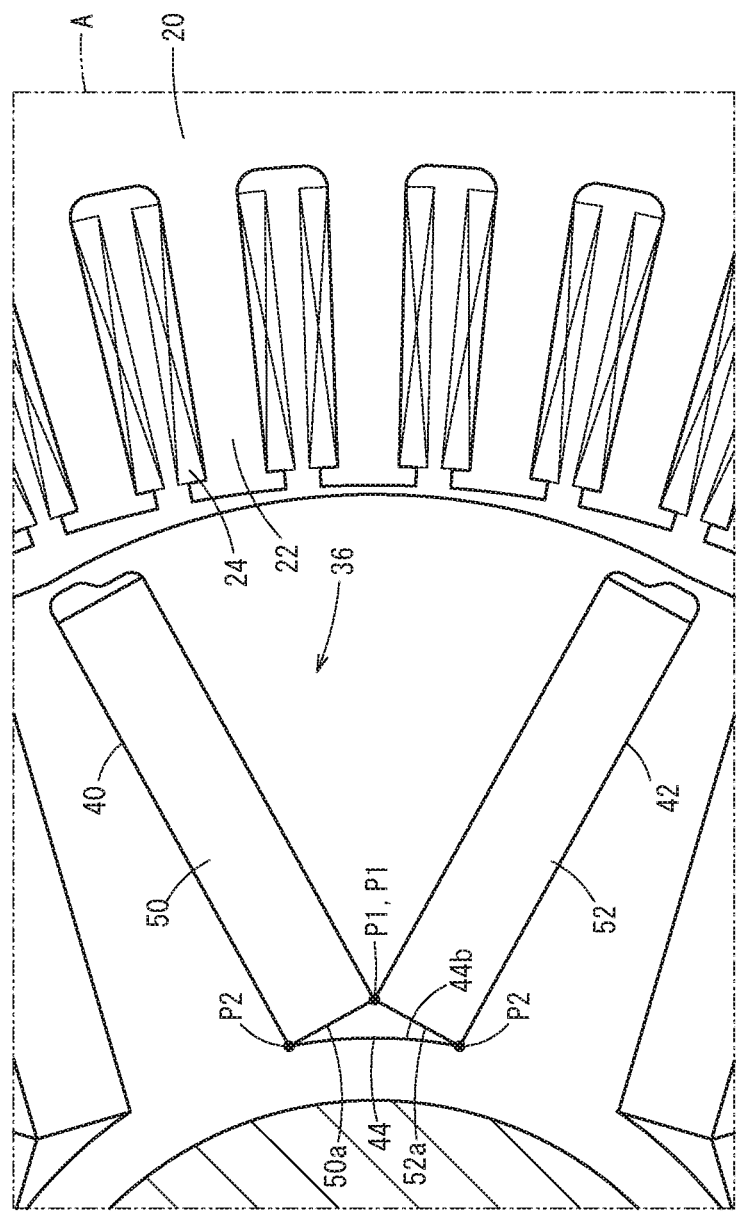
FIG. 3 is an enlarged view of a rectangular portion A in FIG. 1.

For example, in the first embodiment, the first slot 40 and the second slot 42 are separated at the end points P1 and P1. FIG. 3 is an enlarged view of the rectangular portion A in FIG. 1. As shown in FIG. 3, the communicating portion 44 is formed in a substantially isosceles triangular shape when the rotor core 30 is viewed from the direction of the rotary axis O. In this case, when the rotor core 30 is viewed from the direction of the rotary axis O, the side surface 44b between the corner points P2, P2 of the communicating portion 44, the short sides 50a and 52a of the first permanent magnet 50 and the second permanent magnet 52 on the radially inner peripheral side form a space having a substantially isosceles triangular cross-section.

In the first embodiment, when viewed from the direction of the rotary axis of the rotor core 30, the first permanent magnet 50 and the second permanent magnet 52 have substantially the same lengths as the first slot 40 and the second slot 42. However, the first permanent magnet 50 and the second permanent magnet 52 may be formed to be shorter than the first slot 40 and the second slot 42, respectively.

[Technical Idea Obtained from the Embodiment]

Technical ideas that can be grasped from the above embodiment will be described below.

A rotor (14) includes: a rotor core (30) configured to rotate integrally with a rotor shaft (34) and have a first slot (40) and a second slot (42), each penetrating through the rotor core (30) in the direction of a rotational axis (O) and having a substantially rectangular section, the rectangular sections being arranged in a V-shape in which the radially outer ends of the rectangular sections are apart from each other and the radially inner ends are close to each other when viewed from the direction of the rotational axis (O) of the rotor core (30); and a first permanent magnet (50) and a second permanent magnet (52), each having a substantially rectangular shape when viewed from the direction of the rotational axis (O) of the rotor core (30), inserted in the first slot (40) and the second slot (42), respectively. In this rotor, the rotor core is configured to have a communicating portion (44) penetrating through the rotor core (30) in the direction of the rotational axis (O), having a section that is defined by a side connected between the close pair of corner end points (P1, P1) of the rectangular sections of the first and second slots (40, 42) and a side connected between the distant pair of the corner end points (P2, P2) thereof, among the corner end points of the rectangular section of the first slot (40) and those of the second slot (42) on the radially inner side when viewed from the direction of the rotational axis (O) of the rotor core (30). Thereby, it is possible to create such a structure as to separate the entire side faces of the first and second permanent magnets (50) and (52) on the radially inner side from the rotor core (30), hence reduce magnetic flux leakage.

In the above rotor (14), the communicating portion (44) may be configured to have a substantially triangular or substantially trapezoidal shape when viewed from the direction of the rotational axis (O) of the rotor core (30). Thereby, it possible to secure a shrink-fitting margin of the rotor shaft (34) in the rotor core (30).

In the above rotor (14), it is possible to provide a configuration in which the first permanent magnet (50) is arranged such that the short side (50a) of the cross-section thereof on the radially inner side coincides with the short side of the rectangular section of the first slot (40) on the radially inner side while the second permanent magnet (52) is arranged such that the short side (52a) of the cross-section thereof on the radially inner side coincides with the short side of the rectangular section of the second slot (42) on the radially inner side. As a result, the first permanent magnet (50) and the second permanent magnet (52) are made to abut the end points (P1) of the first slot (40) and the second slot (42), thus can be positioned relative to the first slot (40) and the second slot (42), respectively. Further, the dimension of the slot (36) in the rotor core (30) with respect to the radial direction can be shortened, so that the diameter of the rotor core (30) can be reduced.

In the above rotor (14), the communicating portion (44) may be filled with a resin. Thereby, the first permanent magnet (50) and the second permanent magnet (52) can be fixed to the first slot (40) and the second slot (42).

An electric rotating machine (10) may include the above-described rotor (14). This makes it possible to suppress reduction in the torque of the electric rotating machine (10).

What is claimed is:

1. A rotor comprising:
   a rotor core configured to rotate integrally with a rotor shaft;
   a first slot and a second slot, each penetrating through the rotor core in a direction of a rotary axis and when viewed from the direction of the rotary axis of the rotor core, each slot having a substantially rectangular shape with a short inner side and a short outer side and a first long side and a second long side wherein the short inner side and the short outer side each couple an end of the first and second long sides and the short outer sides are radially farther from the rotor shaft than the short inner sides, the short inner side of each of the first slot and the second slot has a first end point and a second end point, the first end points are located closer to each other and the second end points are located farther from each other, the first slot and the second slot being arranged in a V-shape in which the outer sides of the first slot and the second slot are apart from each other and the short inner sides of the first slot and the second slot are close to each other;
   a first permanent magnet and a second permanent magnet, each having a substantially rectangular shape when viewed from the direction of the rotary axis of the rotor core, and being inserted in the first slot and the second slot, respectively; and
   a communicating portion that penetrates through the rotor core in the direction of the rotary axis and when viewed from the direction of the rotary axis of the rotor core, has a first side connecting the first end points of the short inner sides and a second side connecting the second end points of the short inner sides of the first and second slots wherein the first and second sides are arc-shaped with the arcs being centered on the rotary axis, wherein the rotor core is solid and continuous without an opening from a shaft insertion hole to the communicating portion; and the outer end of the first slot and the outer end of the second slot are apart from the outer surface of the rotor core.

2. The rotor according to claim 1, wherein the communicating portion is configured to have a substantially triangular or substantially trapezoidal shape when viewed from the direction of the rotary axis of the rotor core.

3. The rotor according to claim 1, wherein the first and second permanent magnets each have a short side and the first and second slot each have a short side and the first permanent magnet is arranged such that the first permanent magnet's short side on a radially inner side coincides with the first slot's short side on a radially inner side of the first slot, the second permanent magnet is arranged such that the second permanent magnet's short side on a radially inner side coincides with the second slot's short side on a radially inner side of the second slot.

4. The rotor according to claim 1, wherein the communicating portion is filled with resin.

5. An electric rotating machine comprising a rotor according to claim 1.

* * * * *